US012438684B2

(12) United States Patent
Deghel et al.

(10) Patent No.: US 12,438,684 B2
(45) Date of Patent: *Oct. 7, 2025

(54) FLEXIBLE TCI STATE INDICATION UNDER UNIFIED TCI FRAMEWORK

(71) Applicant: NOKIA TECHNOLOGIES OY, Espoo (FI)

(72) Inventors: Matha Deghel, Massy (FR); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 19/183,755

(22) Filed: Apr. 18, 2025

(65) Prior Publication Data

US 2025/0247196 A1  Jul. 31, 2025

Related U.S. Application Data

(63) Continuation of application No. 18/691,262, filed as application No. PCT/FI2022/050578 on Sep. 2, 2022.

(60) Provisional application No. 63/244,582, filed on Sep. 15, 2021.

(51) Int. Cl.
*H04L 5/00* (2006.01)
*H04W 72/232* (2023.01)

(52) U.S. Cl.
CPC ......... *H04L 5/0096* (2013.01); *H04W 72/232* (2023.01)

(58) Field of Classification Search
CPC .... H04W 72/232; H04W 72/23; H04L 5/0096
See application file for complete search history.

(56) References Cited

U.S. PATENT DOCUMENTS

| | | | |
|---|---|---|---|
| 2020/0351892 A1 | 11/2020 | Yi et al. | |
| 2021/0091900 A1* | 3/2021 | Zhang | H04L 5/0044 |
| 2021/0219336 A1 | 7/2021 | Fan et al. | |
| 2021/0226820 A1 | 7/2021 | Khoshnevisan et al. | |
| 2022/0322413 A1* | 10/2022 | Kyung | H04W 72/23 |

(Continued)

FOREIGN PATENT DOCUMENTS

| | | |
|---|---|---|
| EP | 4 017 062 A1 | 6/2022 |
| WO | 2020/165702 A1 | 8/2020 |

(Continued)

OTHER PUBLICATIONS

Office action received for corresponding Australian Patent Application No. 2022348189, dated Nov. 20, 2024, 3 pages.

(Continued)

*Primary Examiner* — Andrew Lee
(74) *Attorney, Agent, or Firm* — SQUIRE PATTON BOGGS (US) LLP

(57) ABSTRACT

Systems, methods, apparatuses, and computer program products for flexible TCI state indications. An apparatus may include at least one processor and at least one memory including computer program code. The at least one memory and the computer program code may be configured to, with the at least one processor, cause the apparatus at least to receive, on a CORESET belonging to a first CORESET group, DCI indicating at least one TCI state. One or more of the at least one TCI states may be mapped to at least a second CORESET group.

20 Claims, 9 Drawing Sheets

(56) References Cited

U.S. PATENT DOCUMENTS

| | | | |
|---|---|---|---|
| 2022/0322423 A1* | 10/2022 | Khoshnevisan | H04L 5/0053 |
| 2022/0361219 A1* | 11/2022 | Khoshnevisan | H04L 5/0094 |
| 2023/0007504 A1* | 1/2023 | Jang | H04W 72/02 |
| 2023/0050480 A1* | 2/2023 | Zhu | H04L 5/0053 |
| 2023/0132040 A1* | 4/2023 | Gao | H04W 72/23 370/329 |
| 2023/0397236 A1* | 12/2023 | Khoshnevisan | H04W 24/08 |
| 2024/0129933 A1* | 4/2024 | Matsumura | H04L 5/0094 |
| 2024/0251469 A1* | 7/2024 | Zhou | H04W 76/20 |
| 2024/0357603 A1* | 10/2024 | Muruganathan | H04L 5/0091 |

FOREIGN PATENT DOCUMENTS

| | | | |
|---|---|---|---|
| WO | 2020/198645 A1 | 10/2020 | |
| WO | 2021/029069 A1 | 2/2021 | |

OTHER PUBLICATIONS

"3rd Generation Partnership Project; Technical Specification Group Radio Access Network; NR; Multiplexing and channel coding (Release 18)", 3GPP TS 38.212, V18.1.0, Dec. 2023, pp. 1-293.

"3rd Generation Partnership Project; Technical Specification Group Radio Access Network; NR; Physical layer procedures for control (Release 16)", 3GPP TS 38.213, V16.6.0, Jun. 2021, pp. 1-187.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"New WID: Further enhancements on MIMO for NR", 3GPP TSG RAN Meeting #86, RP-193133, Agenda: 9.1.1, Samsung, Dec. 9-12, 2019, 5 pages.

"Revised WID: Further enhancements on MIMO for NR", 3GPP TSG RAN Meeting #92e, RP-211586, Agenda: 9.7.1.1, Samsung, Jun. 14-18, 2021, 6 pages.

International Search Report and Written Opinion received for corresponding Patent Cooperation Treaty Application No. PCT/FI2022/050578, dated Dec. 5, 2022, 15 pages.

"3rd Generation Partnership Project; Technical Specification Group Radio Access Network; NR; Physical layer procedure for data (Release 16)", 3GPP TS 38.214, V16.6.0, Jun. 2021, pp. 1-172.

Extended European Search Report corresponding to EP Application No. 22869480.8, dated Jun. 11, 2025.

\* cited by examiner

FLEXIBLE TCI STATE INDICATION UNDER UNIFIED TCI FRAMEWORK

CROSS-REFERENCE TO RELATED APPLICATION

This application is a Continuation of co-pending U.S. patent application Ser. No. 18/691,262, filed on Mar. 12, 2024, which is the National Stage of PCT International Application No. PCT/FI2022/050578, filed on Sep. 2, 2022, and which claims the benefit of U.S. Provisional Patent Application No. 63/244,582, filed on Sep. 15, 2021. The entire content of the above-referenced applications is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for flexible transmission configuration indicator state indications.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, on a control resource set belonging to a first control resource set group, downlink control information indicating at least one transmission configuration indicator state. The method may further include mapping, by the user equipment, one or more of the at least one transmission configuration indicator state to at least a second control resource set group.

In accordance with certain example embodiments, an apparatus may include means for receiving on a control resource set belonging to a first control resource set group, downlink control information indicating at least one transmission configuration indicator state. The apparatus may further include means for mapping one or more of the at least one transmission configuration indicator state to at least a second control resource set group.

In accordance with various example embodiments, an apparatus may include at least one processor and at least one memory including computer program code. The at least one memory and the computer program code may be configured to, with the at least one processor, cause the apparatus to at least receive on a control resource set belonging to a first control resource set group, downlink control information indicating at least one transmission configuration indicator state. The at least one memory and the computer program code may be further configured to, with the at least one processor, cause the apparatus to at least map one or more of the at least one transmission configuration indicator state to at least a second control resource set group.

In accordance with some example embodiments, a non-transitory computer readable medium may be encoded with instructions that may, when executed in hardware, perform a method. The method may include receiving on a control resource set belonging to a first control resource set group, downlink control information indicating at least one transmission configuration indicator state. The method may further include mapping one or more of the at least one transmission configuration indicator state to at least a second control resource set group.

In accordance with certain example embodiments, a computer program product may perform a method. The method may include receiving on a control resource set belonging to a first control resource set group, downlink control information indicating at least one transmission configuration indicator state. The method may further include mapping one or more of the at least one transmission configuration indicator state to at least a second control resource set group.

In accordance with various example embodiments, an apparatus may include circuitry configured to receive on a control resource set belonging to a first control resource set group, downlink control information indicating at least one transmission configuration indicator state. The circuitry may further be configured to map one or more of the at least one transmission configuration indicator state to at least a second control resource set group.

In accordance with some example embodiments, a method may include transmitting, by a network entity, on a control resource set belonging to a first control resource set group, downlink control information indicating at least one transmission configuration indicator state, wherein one or more of the at least one transmission configuration indicator state is mapped to at least a second control resource set group.

In accordance with certain example embodiments, an apparatus may include means for transmitting on a control resource set belonging to a first control resource set group, downlink control information indicating at least one transmission configuration indicator state, wherein one or more of the at least one transmission configuration indicator state is mapped to at least a second control resource set group.

In accordance with various example embodiments, an apparatus may include at least one processor and at least one memory including computer program code. The at least one memory and the computer program code may be configured to, with the at least one processor, cause the apparatus to at least transmit on a control resource set belonging to a first control resource set group, downlink control information indicating at least one transmission configuration indicator state, wherein one or more of the at least one transmission configuration indicator state is mapped to at least a second control resource set group.

In accordance with some example embodiments, a non-transitory computer readable medium may be encoded with instructions that may, when executed in hardware, perform a method. The method may include transmitting on a control resource set belonging to a first control resource set group, downlink control information indicating at least one transmission configuration indicator state, wherein one or more of the at least one transmission configuration indicator state is mapped to at least a second control resource set group.

In accordance with certain example embodiments, a computer program product may perform a method. The method may include transmitting on a control resource set belonging to a first control resource set group, downlink control information indicating at least one transmission configuration indicator state, wherein one or more of the at least one transmission configuration indicator state is mapped to at least a second control resource set group.

In accordance with various example embodiments, an apparatus may include circuitry configured to transmit on a control resource set belonging to a first control resource set group, downlink control information indicating at least one transmission configuration indicator state, wherein one or more of the at least one transmission configuration indicator state is mapped to at least a second control resource set group.

BRIEF DESCRIPTION OF THE DRAWINGS

For proper understanding of example embodiments, reference should be made to the accompanying drawings, wherein.

DETAILED DESCRIPTION

Figure 1:
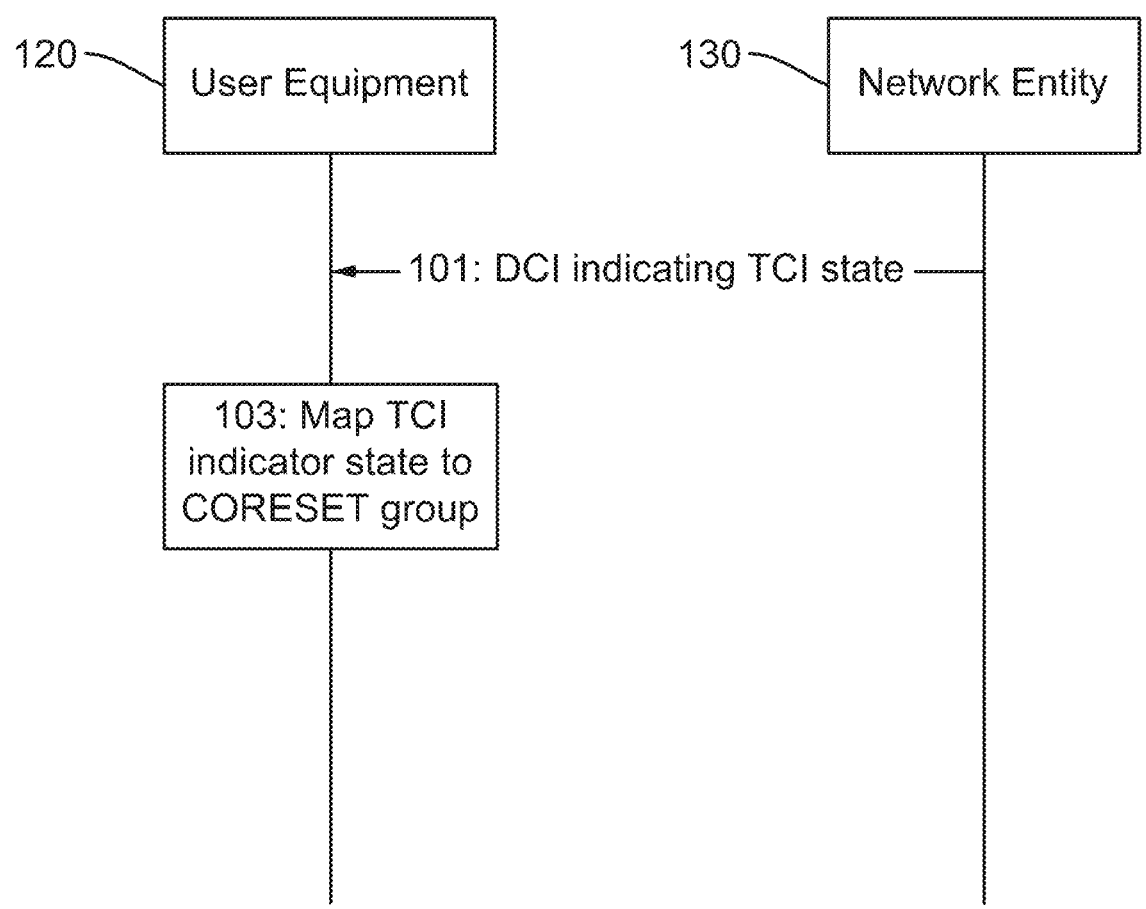
FIG. 1 illustrates an example of a signaling diagram, according to certain example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for flexible TCI state indications is not intended to limit the scope of certain example embodiments, but is instead representative of selected example embodiments.

Third Generation Partnership Project (3GPP) Release (Rel)-16 includes physical downlink shared channel (PDSCH) enhancements to single downlink control information (DCI)/physical downlink control channel (PDCCH)-based, multi-transmission reception point (TRP) transmissions. For example, a subscriber data management (SDM) mode allows for single PDSCH transmissions where two separate layers are transmitted from two TRPs. In addition, frequency division multiplexing (FDM) mode A enables single PDSCH transmissions where two non-overlapping frequency resources are transmitted from two TRPs, while FDM mode B enables two PDSCH transmission occasions (repeating same transport block (TB)) where two non-overlapping frequency resources are transmitted from two TRPs. Similarly, time division multiplexing (TDM) mode A (intra-slot) allows for two PDSCH transmission occasions (repeating same TB) where two non-overlapping time resources (within a slot) are transmitted from two TRPs. In contrast, TDM mode D (inter-slot) enables multiple PDSCH transmission occasions (repeating same TB) where multiple non-overlapping time resources (different slots) are transmitted from two TRPs.

TCI states may be used to signal which channels/antenna ports are quasi co location (QCL), and thus have similar transmit and/or receive processing performed on them. Thus, a TCI state may indicate a spatial relationship between at least two channels and/or between at least two ports. For example, QCL-relationships between downlink reference signals in one channel state information (CSI)-reference signal set and the physical downlink shared channel (PDSCH) demodulation reference (DMRS) signal ports may be indicated using a TCI state.

By using QCL, a UE receiver can e.g., assume that the radio channels corresponding to two different antenna ports have the same large-scale properties in terms of specific parameters if and only if the antenna ports are specified as being QCL. These specific parameters may be one or more of average delay spread, Doppler spread/shift, average delay, spatial Rx parameters, and/or any other suitable parameters. 3GPP TS 38.214 defines four different types of QCL: 'QCL-TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {Spatial Rx parameter}.

Further M-TRP PDSCH enhancements to 3GPP may include setting the maximum number of activated transmission configuration indicator (TCI) states in M-TRP operation as 8; the number of bits of TCI field in DCI is 3 if higher layer parameter tci-PresentInDCI is enabled; and/or the total number of simultaneously activated TCI states as up to 8. Each TCI codepoint in a DCI may also correspond to 1 or 2 TCI states, for a maximum of 2 TRPs. In addition, medium access control control element (MAC CE) enhancements may map one or two TCI states for a TCI codepoint.

Enhancements for multiple DCI/PDCCH based multi-TRP transmissions may include multiple PDCCHs, with each scheduling a respective PDSCH where each PDSCH is transmitted from a separate TRP. A total of 2 codewords may be supported in scheduled PDSCHs, each of which may be scheduled by one PDCCH. A UE may be scheduled with fully/partially/non-overlapped PDSCHs at time and frequency domain by multiple PDCCHs with certain additional restrictions on DMRS configuration, demodulation reference signal (DMRS) ports with the same code division multiplexing (CDM) group, and scheduling. Furthermore, with respect to a control resource set (CORESET), a higher layer parameter CORESETPoolIndex may identify a TRP.

3GPP Rel-17 also includes a variety of M-TRP enhancements. For example, with respect to PDCCH enhancements, support for PDCCH reliability enhancements may be supported via Option 2 (PDCCH repetition)+Case 1 (repeated PDCCH candidates are linked)+Alt-3 (two search space (SS) sets associated with corresponding CORESETs). Two SSSets linked by RRC, and two SS sets may have the same number of monitoring occasions within a slot, and associating PDCCH candidates to be used as a reference in different instances.

Regarding physical uplink control channel (PUCCH) enhancements, M-TRP TDMed PUCCH repetition/transmission operation may be enabled in frequency range (FR)2. For example, two spatial relation info may be activated via MAC CEs, and only one PUCCH resource may be used. Cyclical or sequential mappings of spatial relation information to PUCCH repetitions may also be configured. TRP TDMed PUCCH repetition/transmission operation may also be enabled in FR1. This may be accomplished through the activation of two power control parameters sets (PO, closed-loop index, PL (pathloss) RS) via new MAC CE, the use of one PUCCH resource, and/or configuring cyclical or sequential mapping of power control sets to PUCCH repetitions.

PUSCH enhancements may include support for M-TRP single-DCI based PUSCH repetition/transmission operation, as well as support for M-TRP TDMed PUSCH repetition scheme based on Rel-16 PUSCH repetition Type A and Type B. In addition, two beams/SRIs may be indicated (via DCI), where the same number of layers per TRP is assumed. In case of codebook-based PUSCH, two SRIs and two transmitted precoding matrix indicators (TPMIs) (second TPMI field doesn't indicate number of layers) may be used. And in case of non-codebook based PUSCH, two sounding reference signal resource indicators (SRIs) may be used (second field doesn't indicate number of layers).

3GPP Rel-17 includes a unified TCI framework for multi-beam enhancements. For example, a joint or common TCI state (i.e., indicated TCI) may be used for a set of signals and channels at a time. The TCI state may be a joint downlink (DL)/uplink (UL), separate DL TCI state, and/or separate UL TCI state. The RRC may configure a set (or pool) of joint and/or separate TCI states, and the MAC may activate a number (e.g., 8) of joint and/or separate TCI states. For example, before a first indication, a first activated TCI state may be the current indicated TCI state. In addition, DCI may indicate one of the activated TCI states to be an indicated TCI state (which may be a joint or common TCI state).

In various embodiments, the following terms may be used interchangeably throughout this disclosure: (UL) beam, spatial relation info, (separate) UL TCI state, joint or common TCI state, spatial filter, power control info (or power control parameters set), panel or panel ID, QCL-TypeD (or any other QCL-Type).

Regarding the DCI-based TCI state indication, the DCI format may be 1_1/1_2, with and without DL assignments, and may be used to carry the TCI state indication. This indication may be confirmed by hybrid automatic repeat request (HARQ) acknowledgement (ACK) by UE, and an application time of the beam indication may include the first slot that is at least X ms or Y symbols after the last symbol of the acknowledgment of the joint or separate DL/UL beam indication. TCI field codepoint may be joint (TCI state for both DL and UL), and/or may be separate (a pair of DL TCI state and UL TCI state, a DL TCI state (keep the current UL TCI state), and/or an UL TCI state (keep the current DL TCI state)).

As noted above, the unified TCI framework above does not address more than one DL TCI state (or UL TCI state) indicated at a time. For such cases, a sufficiently flexible and efficient design for TCI state(s) indication operation may be desirable in order to enable covering different multi-TRP transmission/repetition operation modes (such as multi-TRP PDCCH repetition, single-DCI based multi-TRP PDSCH, multi-DCI based multi-TRP PDSCH, etc.), single-TRP mode, and/or any combination of such modes. Thus, when more than one DL TCI state (where such a TCI state may be a joint or a separate TCI state) is indicated at a time, it should be specified how these indicated TCI states may apply, if needed, considering different physical channels such as PDCCH and PDSCH (as well as PUCCH, PUSCH, and SRS), and considering various multi-TRP operation modes.

Certain example embodiments described herein may have various benefits and/or advantages to overcome the disadvantages described above. For example, certain example embodiments may enable flexible and efficient design for TCI state(s) indication for the cases with more than one DL TCI state (or UL TCI state) indicated at a time using unified TCI framework, including multi-TRP context. Furthermore, some example embodiments may provide a flexible and efficient TCI state indication essentially for the cases with more than one DL TCI states indicated under unified TCI framework. Various example embodiments may also enable indicating the TCI state of one CORESET group using a DCI carried by a PDCCH transmitted on another CORESET group, which may help in avoiding or combatting sudden e.g., blockage or issues on one of the links. Thus, certain example embodiments discussed below are directed to improvements in computer-related technology.

As a prerequisite, some embodiments may include at least two subsets/sets/groups of CORESETs configured (e.g., via RRC), where a group of CORESETs may include at least one CORESET. In addition, at least two DL TCI states (among the active TCI states) may be indicated via single TCI codepoint or via two TCI codepoints. For more than one indicated TCI codepoint, these codepoints may be sent in the same (or different) DCI/PDCCH. A DL TCI state may be a joint (or common) TCI state (e.g. applicable for both UL and DL) or a separate DL TCI state.

In certain example embodiments, a DCI carried by a PDCCH transmitted on a CORESET belonging to (or associated with) one CORESET group may indicate (at least) two (active) DL TCI states, where one TCI state may be mapped and/or applied to at least this CORESET group (or to at least the CORESET on which the PDCCH is transmitted) and the other TCI state may be applied to at least another CORESET group. In some embodiments, mapping/applying a TCI state to a CORESET group may indicate that this TCI state is at least used by the UE for PDCCH reception/monitoring on the CORESETs belonging to this CORESET group.

In some example embodiments, where only two CORESET groups are configured (e.g., in a CC, cell, or BWP), the mapping of indicated TCI states to CORESET groups may be done based on a rule and/or indication. For example, in one example embodiment, a DCI indication (e.g., carried in a new field or using an existing/reserved field) may indicate which of the two CORESET groups the first indicated TCI should be applied to (i.e., whether to first TCI state applies to the CORESET group used to transmit the PDCCH carrying the DCI including the TCI states indication, or to the other CORESET group); as a result, given that the first indicated TCI state should be applied to one of the two CORESET groups, the second TCI state may then be applied to the other/remaining CORESET group. Alternatively, the DCI indication may indicate which TCI state should be applied to the CORESET group used to transmit the PDCCH carrying the DCI including the TCI states indication; the other TCI state may then be applied to the other CORESET group.

In various example embodiments, the first TCI state may be applied to the CORESET group on which the PDCCH carrying the DCI including the TCI states indication is transmitted; thus, the second TCI state may be applied to the other CORESET group. Alternatively, the first TCI state may be applied to the CORESET group with a lower/higher index (i.e., identifier (ID)); the second TCI state may thus be applied to the other CORESET group.

In certain example embodiments, a CORESET in a CORESET group may implicitly indicate the order of mapping of indicated TCI states to the two CORESET groups. Specifically, a CORESET or subset of CORESETs in a CORESET group may be configured or associated (e.g., via radio resource control (RRC)) with a mapping order. As an example, the mapping order may be represented by a single bit indicating whether, for example, (i) to map/apply the first TCI state to the CORESET group on which the PDCCH carrying the DCI including the TCI states indication is transmitted (the second TCI state may thus be applied to the other CORESET group) or (ii) to map the second TCI state to the CORESET group on which the PDCCH carrying the DCI including the TCI states indication is transmitted (the first TCI state may be applied to the other CORESET group). As a result, when the DCI containing the two DL TCI states is carried in a PDCCH transmitted on a given CORESET, the UE may know the order for mapping the indicated TCI states to the two CORESET groups.

In certain example embodiments, if more than two CORESET groups are configured (e.g., in a CC, cell, or BWP), an association between CORESET groups may be configured or indicated (via RRC and/or MAC CE, and/or even DCI), where this association may associate (at least) two CORESET groups to each other. This association can be indicated/changed via MAC CE (or even DCI) using a new field(s) by, for example, indicating a first CORESET group ID and a second CORESET group ID. Furthermore, an indication via a (new or existing/reserved) MAC CE field may indicate whether, for a CORESET group, there may be an associated CORESET group indicated in the same MAC CE or not, allowing to break an association between two CORESET groups.

Some example embodiments discussed above associated with two CORESET groups may also apply for a pair of associated CORESET groups. In addition, SS sets linking for multi-TRP PDCCH repetition operation may define how to determine an association between CORESET groups; for example, the CORESET groups to which the CORESETs corresponding to two linked SS sets belong may be considered as associated.

Some example embodiments may be associated with channel applicability of the indicated TCI states depending on the supported m-TRP mode. For example, one of the two (indicated) DL TCI states may be selected/determined by the UE for PDSCH transmission(s), where the determination of channel applicability may be based on a rule and/or an indication. For example, this may be needed in case of multi-TRP PDCCH repetition without PDSCH repetition. For the PDSCH, several options may be applied to select the TCI state from the indicated TCI states. First, the UE may select the TCI state corresponding/mapped to the CORESET group on which the PDCCH scheduling the PDSCH is transmitted. Alternatively, the UE may be configured to select the first indicated TCI state and/or the indicated TCI state corresponding or mapped to the CORESET group with lower/higher index. Additionally or alternatively, a DCI indication (such as using a new field or reserved/existing field) may be used to indicate to the UE which TCI state, among the two indicated DL TCI states, to apply for PDSCH in this case.

In addition, certain example embodiments may resolve conflicts of the indicated TCI state(s) depending on the supported multi-TRP mode. Specifically, in case of delayed coordination between TRPs (e.g., due to non-ideal backhaul in case of multi-DCI mode), a conflict may occur between the indicated DL TCI states as each TRP might indicate two DL TCI states. In order to resolve this, a rule may be defined for the UE to consider the TCI states indication carried in the PDCCH transmitted later/earlier in time, and discard the other indicated TCI states. In case of the same starting symbol for the PDCCHs, the UE may select the TCI states indication in the PDCCH transmitted on the CORESET (or CORESET group) with lower/higher index and/or corresponding to the SS set with lower/higher index. Alternatively, the UE may decide which TCI states indication is selected and use the HARQ ACK feedback (indicated TCI states are applied only after HARQ ACK) to report it. For example, the UE may transmit an acknowledgement (ACK) in response to the selected PDCCH and a non-acknowledgement (NACK) in response to the other PDCCH. Alternatively, the UE may consider indicated TCI state(s) to be valid only if they are indicated TCI state(s) from both TRPs. Otherwise, the UE may discard the received indication.

Various example embodiments may be considered for applicability of a single indicated (DL) TCI state to the different CORESETs or CORESET groups. For example, when one/single DL TCI state is indicated via DCI, the UE may be indicated or configured whether to apply this TCI state only to the corresponding CORESET group (used to transmit the PDCCH carrying the DCI) or to apply this TCI state to all CORESET groups (or simply to all CORESETs, e.g., within the CC) or to at least one other CORESET group such as the associated one(s) (if any). The indication may be carried via RRC, MAC CE (in a new or reserved field) or DCI (new or existing/reserved field). Alternatively, the CORESET used to transmit the PDCCH carrying the DCI including the indicated DL TCI state may be used to (implicitly) indicate, for example, whether this TCI state should be applied only to the corresponding CORESET group (used to transmit the PDCCH carrying the DCI) or to apply this TCI state to all CORESET groups; in this case, this information may be added as part of the CORESET(s) (or CORESET group) configuration(s).

In certain example embodiments, applicability of the number of indicated TCI state(s) depending on the supported multi-TRP mode may be considered. For example, the UE may receive an indication on whether to apply the two indicated DL TCI states (based on the above proposed ways/variants) to two (corresponding) CORESET groups or only one of these two DL TCI states should be applied. This indication may be sent via DCI e.g., using new field or reserved/existing field. In certain example embodiments, the CORESET used to transmit the PDCCH carrying the DCI including the indicated TCI states or any other DCI may be used to (implicitly) indicate whether both DL TCI states should be applied or only one of them. This can be done by associating a CORESET(s) to such information (i.e., apply both TCI states or only one TCI state) e.g., via RRC (or even MAC CE). For single-DCI based multi-TRP PDSCH schemes (or even SFN-like multi-TRP PDSCH), the UE may be indicated to apply only one TCI state, e.g., the first TCI state, i.e. this TCI state is applied to its corresponding CORESET group but the second TCI state is not applied to its corresponding CORESET group—where the ways/variants to determine the mapping of TCI states to CORESET groups are provided earlier.

In certain example embodiments, among the TCI codepoints associated to active TCI states (where these TCI codepoints may be termed as 'activated TCI codepoints'), a TCI codepoint may be associated via MAC CE with (at least) two CORESET groups or with a single CORESET group—by e.g., indicating the CORESET group index(es) associated to this TCI codepoint via MAC CE, where an indication (via new or reserved field) indicating whether e.g. one or (at least) two CORESET groups are associated to this TCI codepoint may be used. If the TCI codepoint is associated with (at least) two CORESET groups, when this TCI codepoint is indicated via DCI, the TCI states contained in this codepoint (or some of them, such as only the DL TCI state) may only be applicable to the associated CORESET groups. That is, in case of two CORESET groups and two TCI states, each TCI state may be applied/mapped to one CORESET group. The previously discussed indication and/or rules for mapping TCI states to CORESET groups may be used in this case. If the TCI codepoint is associated with a single CORESET group, when this TCI codepoint is indicated via DCI, the TCI state contained in this codepoint may only be applicable to the associated CORESET group.

In some example embodiments, in addition to applying it to the associated CORESET group(s) to a TCI codepoint, the TCI state(s) (or at least some of them in case of more than one TCI state) contained in this TCI codepoint (when indicated) may also apply to the CORESET or CORESET group using which the PDCCH carrying the DCI indicating the TCI codepoint is transmitted.

Various example embodiments may include a DL TCI state (or more generally, a TCI state) pointing to two quasi co-location (QCL)-TypeD (or any other QCL-Type, such as QCL-TypeA, QCL-TypeB, QCL-TypeC, etc.) at a time (and thus a single DL TCI state indicated instead of two). The descriptions above (e.g., regarding mapping of TCI states to CORESET groups) may be adapted and used in this case, by essentially replacing TCI state with QCL-TypeD (or any other QCL-Type).

In certain example embodiments with more than two CORESET groups, a CORESET group may be associated with more than one other CORESET group. In this case, a rule and/or indication may be defined for the UE to determine the mapping of indicated (DL) TCI states to these CORESETs. At least some of the above proposed ways and alternatives may be leveraged/adapted for this case. Furthermore, in various example embodiments, in case of multi-TRP SFN-like operation, a CORESET or a CORESET group may be indicated/associated with two TCI states. Additionally or alternatively, in various example embodiments, at least one of the indicated TCI states may apply to only certain physical channels and/or reference signals (RSs).

Figure 8:
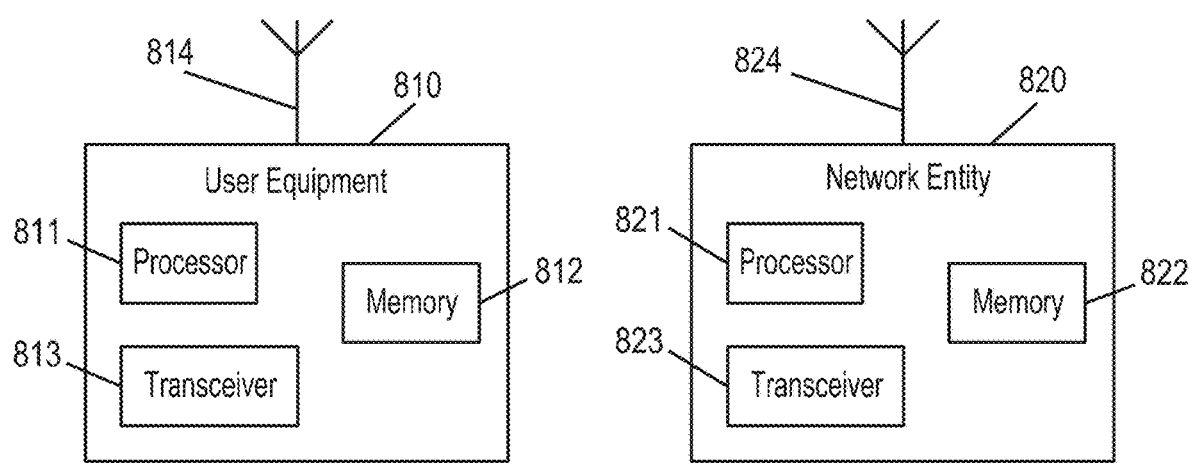
FIG. 8 illustrates an example of various network devices, according to some example embodiments.

FIG. 1 illustrates an example of a signaling diagram for flexible TCI state indications, according to certain example embodiments. UE 120 and NE 130 may be similar to UE 810 and NE 820, as illustrated in FIG. 8, according to certain example embodiments. At 101, NE 130 may transmit, on a CORESET belonging to a first CORESET group, DCI indicating at least one TCI state to UE 120. At 103, UE 120 may map one or more of the at least one TCI state to at least a second CORESET group.

Additionally or alternatively, UE 120 may receive CORESET grouping configuration information of including least one CORESET in at least one CORESET group, and at least another CORESET in at least another CORESET group. Additionally or alternatively, UE 120 may receive another indication indicating that the one or more of the at least one TCI state is applied to at least one of: downlink data channel transmission, downlink control channel transmission, uplink data channel transmission, or uplink control channel transmission.

In some example embodiments, UE 120 may receive a mapping information for mapping the one or more of the at least one indicated TCI state to the at least one second CORESET group and mapping another one or more of the at least one indicated TCI state to the first CORESET group. In addition, the mapping information may comprise at least one of a rule, or an indication provided in the downlink control information.

In various example embodiments, in case the at least one TCI state comprises more than two CORESET groups, UE 120 may receive an information of association between CORESET groups via signaling of at least one of RRC, MAC CE, or the DCI, associating at least two CORESET groups to each other, wherein the first control resource set group and the at least second control resource set group are among the associated control resource set groups. Additionally or alternatively, in case the at least one TCI state comprises two TCI states, a first TCI state and a second TCI state, the indication may indicate that the first TCI state is applied to the first CORESET group, and the second TCI state is applied to the at least second CORESET group. Additionally or alternatively, in case the at least one TCI state comprises two TCI states, a first transmission configuration indicator state and a second transmission configuration indicator state, a rule comprises applying the first transmission configuration indicator state to the first control resource set group and applying the second transmission configuration indicator state to the at least second control resource set group. In case the at least one TCI state comprises two TCI states, the rule or the indication may comprise using the CORESET to implicitly indicate mapping of the at least one TCI state to the first CORESET group and the at least second CORESET group.

In certain example embodiments, the at least one TCI state may comprise at least two QCL information, and the mapping information may be configured to map the at least two QCL information to the first CORESET group and the at least second CORESET group.

Figure 2:
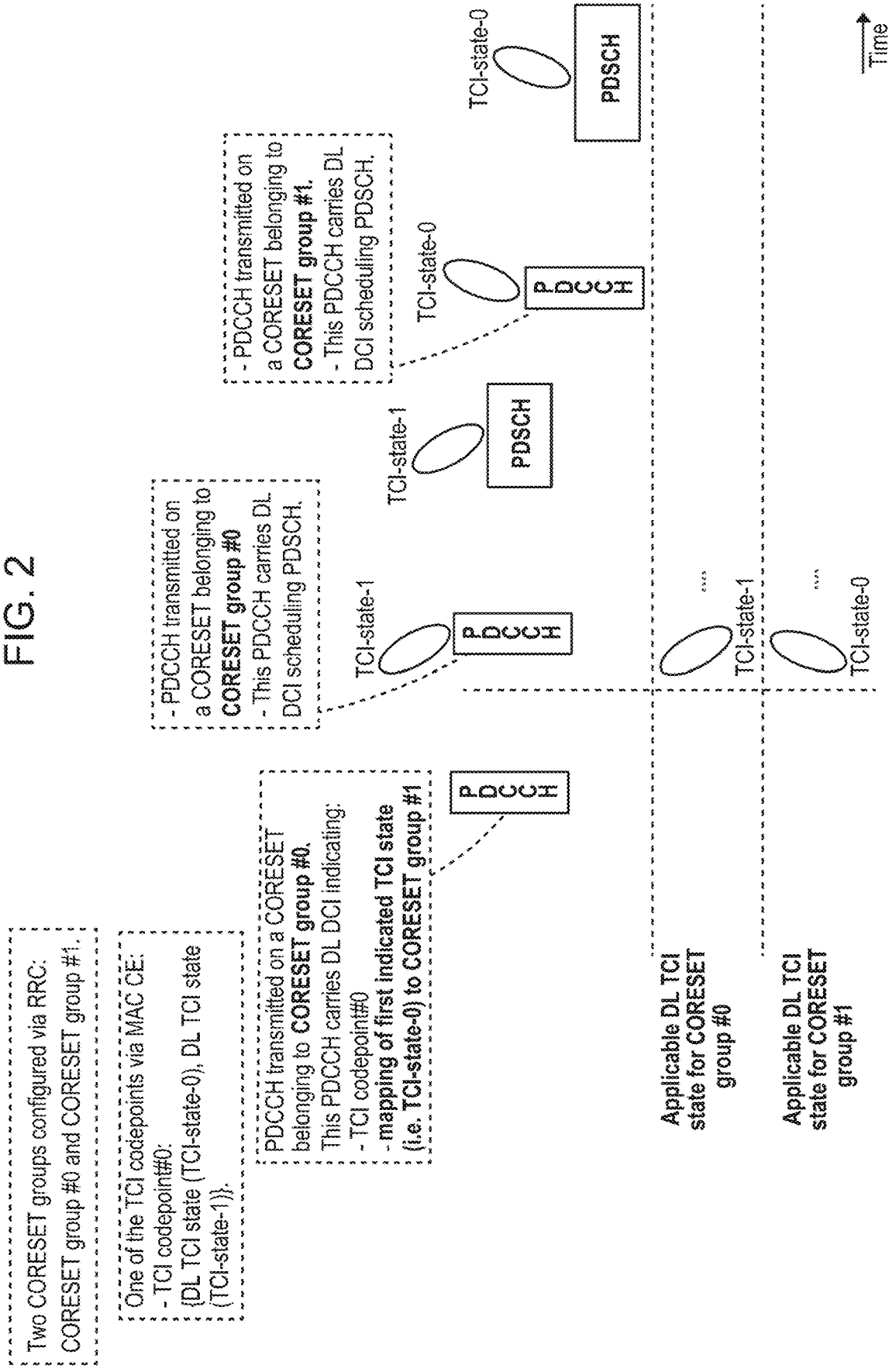
FIG. 2 illustrates an example of certain example embodiments.

FIG. 2 illustrates certain example embodiments where one of the TCI codepoints may be TCI codepoint #0 containing {DL TCI state (TCI-state-0), DL TCI state (TCI-state-1)}. Other combinations of TCI states within a TCI codepoint, such as two joint (or common) TCI states or {one joint TCI state and one separate TCI state}, may also be possible. In addition, there may be two CORESET groups configured, namely CORESET group #0 and CORESET group #1.

In some example embodiments, the UE may be indicated TCI codepoint #0 via DL DCI. This DCI may also contain an indication (e.g., 1-bit field) configured to map the first TCI state to one of the two configured CORESET groups as follows: e.g., bit '0' may indicate that a first indicated TCI state is mapped (i.e., applied) to the CORESET group on which the PDCCH carrying the DCI is transmitted, i.e., CORESET group #0, and bit '1' indicates that the first indicated TCI state is mapped to the other CORESET group, i.e., CORESET group #0. FIG. 2 illustrates that this indication may map the first indicated TCI state, i.e., TCI-state-0, to CORESET group #1. Thus, the second indicated TCI state, i.e., TCI-state-1, may map (i.e., apply) to CORESET group #0. The vertical dashed line represents the time after which the indicated TCI states become applicable.

Figure 3:
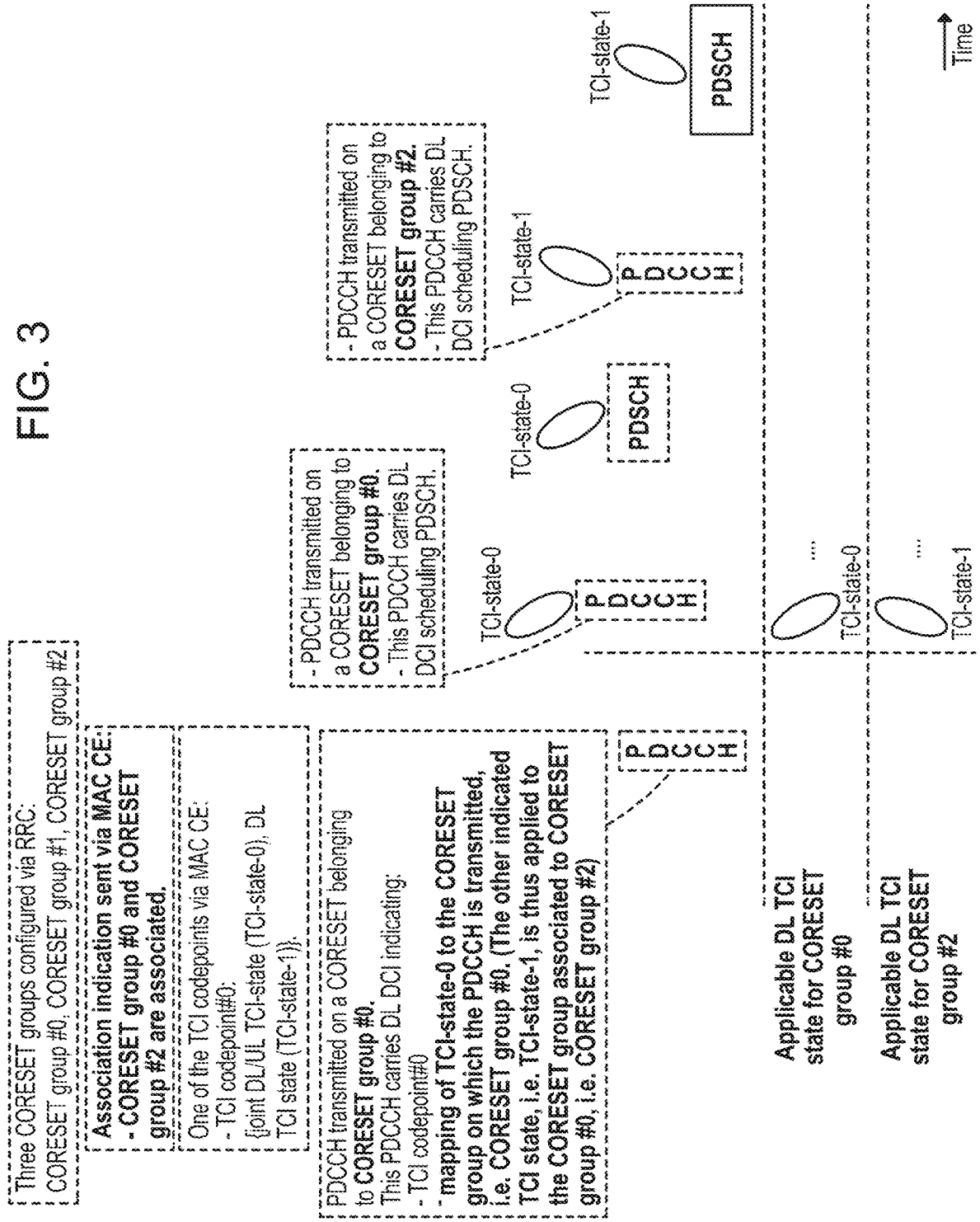
FIG. 3 illustrates another example of some example embodiments.

FIG. 3 illustrates some example embodiments where one of the TCI codepoints is TCI codepoint #0 containing {joint DL/UL TCI state (TCI-state-0), DL TCI state (TCI-state-1)}. Other combinations of TCI states within a TCI codepoint, such as two separate DL TCI states or two joint (or common) TCI states, may also be possible. There may be three CORESET groups configured via RRC, namely CORESET group #0, CORESET group #1 and CORESET group #2.

In various example embodiments, the UE may be indicated an association between CORESET group #0 and CORESET group #2, where this association indication is carried via MAC CE.

In certain example embodiments, the UE is indicated as a TCI codepoint #0 via DL DCI. This DCI may also contain an indication (e.g., 1-bit field) for mapping the first TCI state to one of the two configured CORESET groups as follows: e.g., bit '0' indicates that first indicated TCI state is mapped (i.e., applied) to the CORESET group on which the PDCCH carrying the DCI is transmitted, i.e. CORESET group #0, and bit '1' indicates that the first indicated TCI state is mapped to the CORESET group associated to CORESET group #0, i.e., CORESET group #2. FIG. 3 indicates that this indication maps the first indicated TCI state, i.e., TCI-state-0, to CORESET group #0. Thus, the second indicated TCI state, i.e., TCI-state-1, maps (i.e., applies) to CORESET group #2. Additionally or alternatively, the first indicated TCI state may apply to the CORESET group on which the PDCCH carrying the DCI indicating the two TCI states (i.e., the TCI codepoint), and the second indicated TCI state may apply to the CORESET group associated to that CORESET group.

Figure 4:
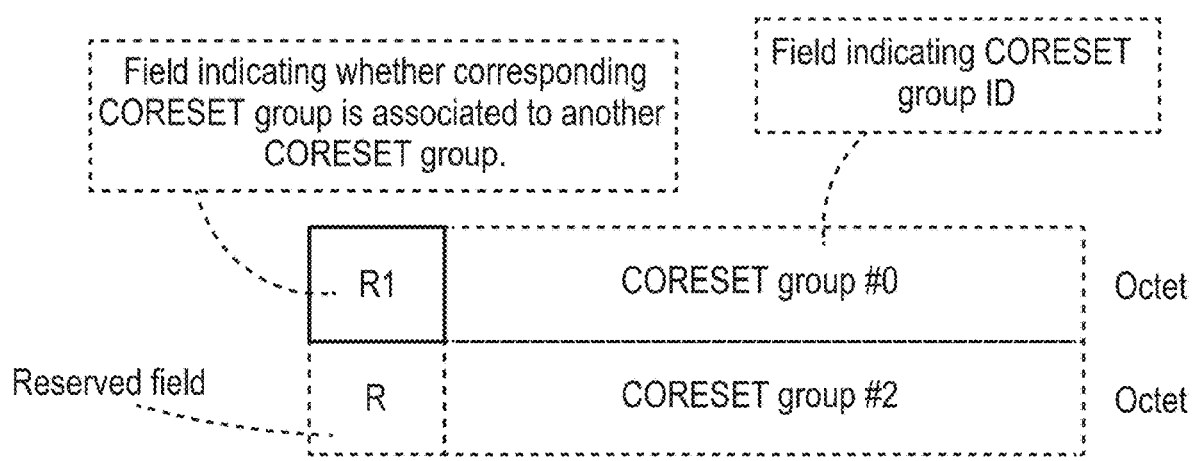
FIG. 4 illustrates an example of a medium access control control element (MAC CE) design option for control resource set (CORESET) groups association indication, according to various example embodiments.

Various example embodiments may include three CORESET groups configured via RRC, e.g., CORESET group #0, CORESET group #1 and CORESET group #2. To provide the CORESET group association indication via MAC CE, for example, as illustrated in FIG. 4, one octet may consist of (i) a field providing a CORESET group ID, and (ii) another field (e.g., 1-bit field) providing an indication whether this CORESET group is associated to another CORESET group; this latter field is denoted R1 in FIG. 4. If R1 indicates that the CORESET group is associated to another CORESET group, then another octet is (assumed to be) added and used to at least indicate the CORESET group ID associated to the first one. As illustrated in FIG. 4, assuming that R1 is a 1-bit field: e.g., R1='0' indicates that CORESET group #0 is not associated to any CORESET group, and R1='1' indicates that CORESET group #0 is associated to another CORESET group for which the ID is provided in the next octet, i.e., CORESET group #2.

Figure 5:
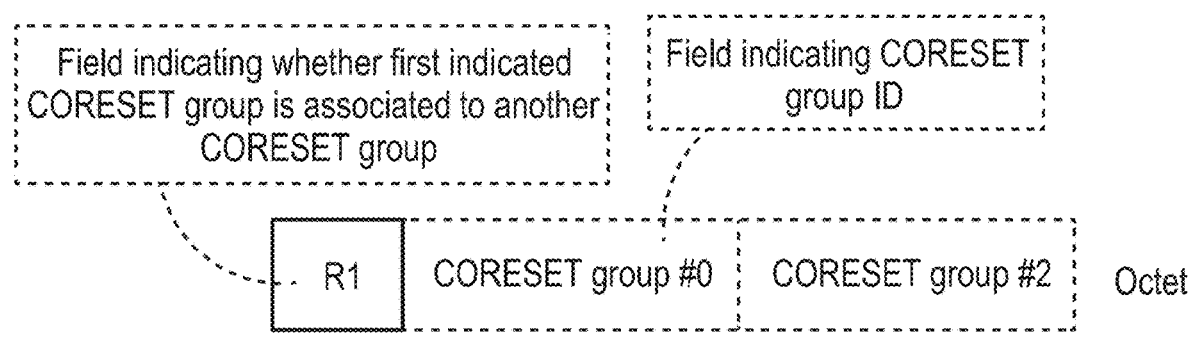
FIG. 5 illustrates another example of a MAC CE design option for CORESET groups association indication, according to some example embodiments.

In some example embodiments, to provide the CORESET group association indication via MAC CE, as illustrated in FIG. 5, one octet may consist of (i) a field providing a CORESET group ID, (ii) a field indicating whether this CORESET group is associated to another CORESET group, and (iii) a field providing the ID of the CORESET group associated (if any) to the first CORESET group; field (ii) is denoted R1 in FIG. 5. For example, if R1 indicates that the first indicated CORESET group is associated to another CORESET group, the UE may read the other field in order to extract the ID of the CORESET associated to the first one. As illustrated in FIG. 5, assuming that R1 is a 1-bit field: e.g., R1='0' indicates that CORESET group #0 is not associated to any CORESET group, and R1='1' indicates that CORESET group #0 is associated to another CORESET group for which the ID is provided in the other CORESET group ID field, i.e., CORESET group #2.

In various example embodiments, to provide the CORESET group association indication via MAC CE, a first field may indicate CORESET group ID, and a second field may indicate there is no association or the CORESET group ID in case of association. Specifically, a dedicated/special index could be used to indicate that there is no association, such as index 0; in which case, clearly this index may not be used as one of the configured CORESET group IDs. Thus, if the second field indicates this special index, then the first indicated CORESET group is not associated to another CORESET group; otherwise, the ID indicated in the second field is the ID of the CORESET group associated to the first one. In other example embodiments, instead of a special index, to indicate there is no association, another possibility is that the second field may simply indicate the same CORESET group ID as the first field. If some of the bits are not used in an octet, they may be set as one or more reserved fields/bits.

In some embodiments, in case of M-TRP multi-DCI mode, a CORESET group may be a CORESET pool identified by a CORESETPoolIndex (which represents a TRP).

Figure 6:
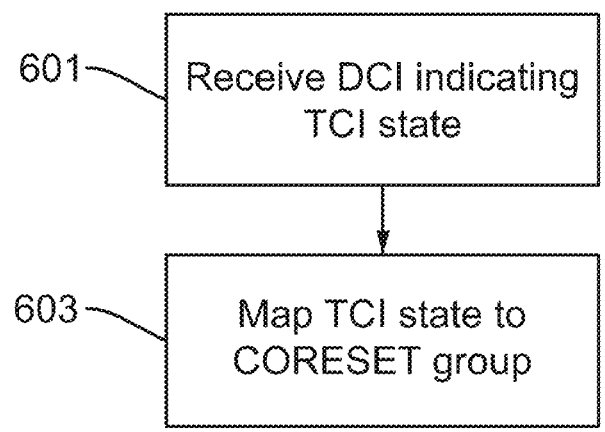
FIG. 6 illustrates an example of a flow diagram of a method according to various example embodiments.

FIG. 6 illustrates an example of a flow diagram of a method that may be performed by a UE, such as UE 810 illustrated in FIG. 8, according to various example embodiments. At 601, the method may include receiving, on a CORESET belonging to a first CORESET group, DCI indicating at least one TCI state from a NE, which may be similar to NE 820 illustrated in FIG. 8. At 603, the method may further include mapping one or more of the at least one TCI state to at least a second CORESET group.

Additionally or alternatively, the method may further include receiving CORESET grouping configuration information of including least one CORESET in at least one CORESET group, and at least another CORESET in at least another CORESET group. Additionally or alternatively, the method may further include receiving another indication indicating that the one or more of the at least one TCI state is applied to at least one of: downlink data channel transmission, downlink control channel transmission, uplink data channel transmission, or uplink control channel transmission.

In some example embodiments, the method may further include receiving mapping information for mapping the one or more of the at least one indicated TCI state to the at least one second CORESET group and mapping another one or more of the at least one indicated TCI state to the first CORESET group. In addition, the mapping information may comprise at least one of a rule, or an indication provided in the downlink control information.

In various example embodiments, in case the at least one TCI state comprises more than two CORESET groups, the method may further include receiving an information of association between CORESET groups via signaling of at least one of RRC, MAC CE, or the DCI, associating at least two CORESET groups to each other, wherein the first control resource set group and the at least second control resource set group are among the associated control resource set groups. Additionally or alternatively, in case the at least one TCI state comprises two TCI states, a first TCI state and a second TCI state, the indication may indicate that the first TCI state is applied to the first CORESET group, and the second TCI state is applied to the at least second CORESET group. Additionally or alternatively, in case the at least one TCI state comprises two TCI states, a first transmission configuration indicator state and a second transmission configuration indicator state, a rule comprises applying the first transmission configuration indicator state to the first control resource set group and applying the second transmission configuration indicator state to the at least second control resource set group. In case the at least one TCI state comprises two TCI states, the rule or the indication may comprise using the CORESET to implicitly indicate mapping of the at least one TCI state to the first CORESET group and the at least second CORESET group.

In certain example embodiments, the at least one TCI state may comprise at least two QCL information, and the mapping information may be configured to map the at least two QCL information to the first CORESET group and the at least second CORESET group.

Figure 7:
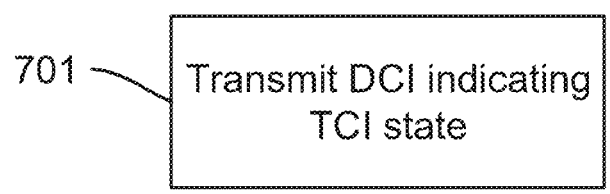
FIG. 7 illustrates an example of a flow diagram of another method according to some example embodiments.

FIG. 7 illustrates an example of a flow diagram of a method that may be performed by a NE, such as NE 820 illustrated in FIG. 8, according to various example embodiments. At 701, the method may include transmitting, on a CORESET belonging to a first CORESET group, DCI indicating at least one TCI state to a UE, which may be similar to UE 810 in FIG. 8.

Additionally or alternatively, the method may further include transmitting CORESET grouping configuration information of including least one CORESET in at least one CORESET group, and at least another CORESET in at least another CORESET group. Additionally or alternatively, the method may further include transmitting another indication indicating that the one or more of the at least one TCI state is applied to at least one of: downlink data channel transmission, downlink control channel transmission, uplink data channel transmission, or uplink control channel transmission.

In some example embodiments, the method may further include transmitting mapping information for mapping the one or more of the at least one indicated TCI state to the at least a second CORESET group and mapping another one or more of the at least one indicated TCI state to the first CORESET group. In addition, the mapping information may comprise at least one of a rule, or an indication provided in the downlink control information.

In various example embodiments, in case the at least one TCI state comprises more than two CORESET groups, the method may further include transmitting information of association between CORESET groups via signaling of at least one of RRC, MAC CE, or the DCI, associating at least two CORESET groups to each other, wherein the first control resource set group and the at least second control resource set group are among the associated control resource set groups. Additionally or alternatively, in case the at least one TCI state comprises two TCI states, a first TCI state and a second TCI state, the indication may indicate that the first TCI state is applied to the first CORESET group, and the second TCI state is applied to the at least second CORESET group. Additionally or alternatively, in case the at least one TCI state comprises two TCI states, a first transmission configuration indicator state and a second transmission configuration indicator state, a rule comprises applying the first transmission configuration indicator state to the first control resource set group and applying the second transmission configuration indicator state to the at least second control resource set group. In case the at least one TCI state comprises two TCI states, the rule or the indication may comprise using the CORESET to implicitly indicate mapping of the at least one TCI state to the first CORESET group and the at least second CORESET group.

In certain example embodiments, the at least one TCI state may comprise at least two QCL information, and the mapping information may be configured to map the at least two QCL information to the first CORESET group and the at least second CORESET group.

FIG. 8 illustrates an example of a system according to certain example embodiments. In one example embodiment, a system may include multiple devices, such as, for example, UE 810 and/or NE 820.

UE 810 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 820 may be one or more of a base station, such as an eNB or gNB, a serving gateway, a server, and/or any other access node or combination thereof. Furthermore, UE 810 and/or NE 820 may be one or more of a citizens broadband radio service device (CBSD).

NE 820 may further comprise at least one gNB-CU, which may be associated with at least one gNB-DU. The at least one gNB-CU and the at least one gNB-DU may be in communication via at least one F1 interface, at least one Xn-C interface, and/or at least one NG interface via a 5GC.

UE 810 and/or NE 820 may include at least one processor, respectively indicated as 811 and 821. Processors 811 and 821 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 812 and 822. The memory may be fixed or removable. The memory may include computer program instructions or computer code contained therein. Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 811 and 821, memories 812 and 822, and any subset thereof, may be configured to provide means corresponding to the various blocks of FIGS. 1-7. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple RATs. Other configurations of these devices, for example, may be provided. Transceivers 813 and 823 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-7). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-7. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 9:
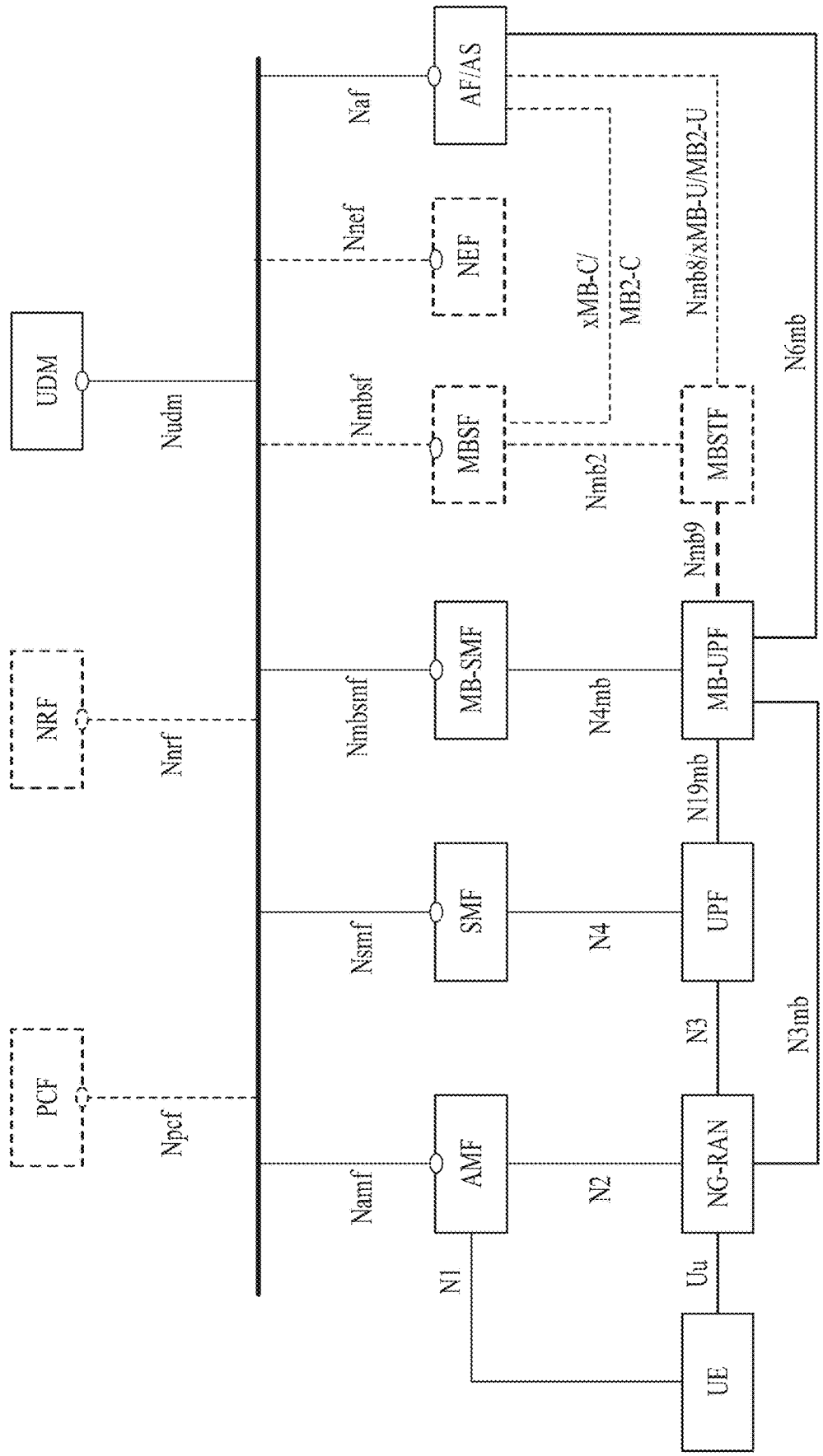
FIG. 9 illustrates an example of a 5G network and system architecture, according to certain example embodiments.

FIG. 9 illustrates an example of a 5G network and system architecture, according to certain example embodiments. Shown are multiple network functions that may be implemented as software operating as part of a network device or dedicated hardware, as a network device itself or dedicated hardware, or as a virtual function operating as a network device or dedicated hardware. The UE and NE illustrated in FIG. 9 may be similar to UE 810 and NE 820, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

According to certain example embodiments, processor 811 and memory 812 may be included in or may form a part of processing circuitry or control circuitry. In addition, in some example embodiments, transceiver 813 may be included in or may form a part of transceiving circuitry.

For instance, in certain example embodiments, apparatus 810 may be controlled by memory 812 and processor 811 to receive, on a CORESET belonging to a first CORESET group, DCI indicating at least one TCI state, and to map one or more of the at least one TCI state to at least a second CORESET group.

In certain example embodiments, apparatus 820 may be controlled by memory 822 and processor 821 to transmit, on a CORESET belonging to a first CORESET group, DCI indicating at least one TCI state, wherein one or more of the at least one TCI state is mapped to at least a second CORESET group.

In some example embodiments, an apparatus (e.g., UE 810 and/or NE 820) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving, on a CORESET belonging to a first CORESET group, DCI indicating at least one TCI state, and means for mapping one or more of the at least one TCI state to at least a second CORESET group.

Certain example embodiments may be directed to an apparatus that includes means for performing any of the methods described herein including, for example, means for transmitting, on a CORESET belonging to a first CORESET group, DCI indicating at least one TCI state, wherein one or more of the at least one TCI state is mapped to at least a second CORESET group.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
ACK Acknowledgement
AMF Access and Mobility Management Function
ASIC Application Specific Integrated Circuit
BWP Bandwidth Part
CBSD Citizens Broadband Radio Service Device CC Component Carrier
CCE Control Channel Element
CDM Code Division Multiplexing
CN Core Network
CORESET Control Resource Set
CPU Central Processing Unit
CSI Channel State Information
DCI Downlink Control Information
DL Downlink
DMRS Demodulation Reference Signal
eMBB Enhanced Mobile Broadband
eMTC Enhanced Machine Type Communication
eNB Evolved Node B
EPS Evolved Packet System
FDM Frequency Division Multiplexing
FR1 Frequency Range 1
gNB Next Generation Node B
GPS Global Positioning System
HARQ Hybrid Automatic Repeat Request
HARQ ACK Hybrid Automatic Repeat Request Acknowledgement
HDD Hard Disk Drive
ID Identifier
LTE Long-Term Evolution
LTE-A Long-Term Evolution Advanced
MAC CE Medium Access Control Control Element
MCS Modulation and Coding Scheme
MIMO Multiple Input Multiple Output
MME Mobility Management Entity
mMTC Massive Machine Type Communication
MPDCCH Machine Type Communication Physical Downlink Control Channel
MTC Machine Type Communication
NACK Non-Acknowledgement
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NR-U New Radio Unlicensed
PDA Personal Digital Assistance
PDCCH Physical Downlink Control Channel
PDSCH Physical Downlink Shared Channel
PRACH Physical Random Access Channel
PRI Physical Uplink Control Channel Resource Index
PUCCH Physical Uplink Control Channel
PUSCH Physical Uplink Shared Channel
QCL Quasi Co-Location
RAM Random Access Memory
RAN Radio Access Network
RAT Radio Access Technology
RE Resource Element
RLC Radio Link Control
RRC Radio Resource Control
RS Reference Signal
SDM Subscriber Data Management
SR Scheduling Report
SRB Signaling Radio Bearer
SRI Sounding Reference Signal Resource Indicator
SS Search Space
SSB Synchronization Signal Block
TB Transport Block
TCI Transmission Configuration Indicator
TDM Time Division Multiplexing
TPMI Transmitted Precoding Matrix Indicator
TR Technical Report
TRP Transmission Reception Point
TS Technical Specification
UCI Uplink Control Information
UE User Equipment
UL Uplink
UMTS Universal Mobile Telecommunications System
URLLC Ultra-Reliable and Low-Latency Communication
UTRAN Universal Mobile Telecommunications System Terrestrial Radio Access Network
WLAN Wireless Local Area Network

The invention claimed is:

1. An apparatus, comprising:
at least one processor; and
at least one memory including computer program code,
wherein the at least one memory and the computer program code are configured to, with the at least one processor, cause the apparatus at least to:
receive, on a control resource set belonging to a first control resource set group, downlink control information indicating at least one transmission configuration indicator state;
map one or more of the at least one transmission configuration indicator state, indicated by the downlink control information received on the control resource set belonging to the first control resource set group, to at least a second control resource set group;
map another one or more of the at least one transmission configuration indicator state, indicated by the downlink control information received on the control resource set belonging to the first control resource set group, to the first control resource set group; and
receive a first indication indicating which of the at least one transmission configuration indicator state is applied for downlink data channel transmission.

2. The apparatus of claim 1, wherein the at least one memory and the computer program code are further configured to, with the at least one processor, cause the apparatus at least to:
receive mapping information for mapping the one or more of the at least one indicated transmission configuration indicator state to the at least one second control resource set group, and mapping the another one or more of the at least one indicated transmission configuration indicator state to the first control resource set group.

3. The apparatus of claim 2, wherein the mapping information comprises at least one of a rule, or a second indication provided in the downlink control information.

4. The apparatus of claim 1, wherein the at least one memory and the computer program code are further configured to, with the at least one processor, cause the apparatus at least to:
in case the at least one transmission configuration indicator state comprising more than two control resource set groups, receive an information of association between control resource set groups via signaling of at least one of radio resource control, medium access control control element, or the downlink control information, associating at least two control resource set groups to each other, wherein the first control resource set group and the at least second control resource set group are among the associated control resource set groups.

5. The apparatus of claim 3, wherein, in case the at least one transmission configuration indicator state comprising a first transmission configuration indicator state and a second transmission configuration indicator state, the second indication indicates that the first transmission configuration indicator state is applied to the first control resource set group, and the second transmission configuration indicator state is applied to the at least second control resource set group.

6. The apparatus of claim 3, wherein, in case the at least one transmission configuration indicator state comprising a first transmission configuration indicator state and a second transmission configuration indicator state, the rule comprises applying the first transmission configuration indicator state to the first control resource set group, and applying the second transmission configuration indicator state to the at least second control resource set group.

7. The apparatus of claim 3, wherein, in case the at least one transmission configuration indicator state comprising two transmission configuration indicator states, the rule or the second indication comprises using the control resource set to implicitly indicate mapping of the at least one transmission configuration indicator state to the first control resource set group and the at least second control resource set group.

8. The apparatus of claim 2, wherein the at least one transmission configuration indicator state comprises at least two quasi co-location information, and the mapping information is for mapping the at least two quasi co-location information to the first control resource set group and the at least second control resource set group.

9. The apparatus of claim 1, wherein the at least one memory and the computer program code are further configured to, with the at least one processor, cause the apparatus at least to:
receive control resource set grouping configuration information comprising at least one control resource set in at least one control resource set group, and at least another control resource set in at least another control resource set group.

10. The apparatus of claim 1, wherein the
first indication indicates that the one or more of the at least one transmission configuration indicator state is applied to at least one of: downlink control channel transmission, uplink data channel transmission, or uplink control channel transmission.

11. An apparatus, comprising:
at least one processor; and
at least one memory including computer program code,
wherein the at least one memory and the computer program code are configured to, with the at least one processor, cause the apparatus at least to:
transmit, on a control resource set belonging to a first control resource set group, downlink control information indicating at least one transmission configuration indicator state, wherein one or more of the at least one transmission configuration indicator state, indicated by the downlink control information transmitted on the control resource set belonging to the first control resource set group, is mapped to at least a second control resource set group, and wherein another one or more of the at least one transmission configuration indicator state, indicated by the downlink control information received on the control resource set belonging to the first control resource set group, is mapped to the first control resource set group; and
transmit a first indication indicating which of the at least one transmission configuration indicator state is applied for downlink data channel transmission.

12. The apparatus of claim 11, wherein the at least one memory and the computer program code are further configured to, with the at least one processor, cause the apparatus at least to:
transmit control resource set grouping configuration information comprising at least one control resource set in at least one control resource set group, and at least another control resource set in at least another control resource set group.

13. The apparatus of claim 11, wherein the
first indication indicates that the one or more of the at least one transmission configuration indicator state is applied to at least one of: downlink control channel transmission, uplink data channel transmission, or uplink control channel transmission.

14. The apparatus of claim 11, wherein the at least one memory and the computer program code are further configured to, with the at least one processor, cause the apparatus at least to:
transmit mapping information for mapping the one or more of the at least one indicated transmission configuration indicator state to the at least second control resource set group, and mapping the another one or more of the at least one indicated transmission configuration indicator state to the first control resource set group.

15. The apparatus of claim 11, wherein the mapping information comprises at least one of a rule or a second indication provided in the downlink control information.

16. The apparatus of claim 11, wherein the at least one memory and the computer program code are further configured to, with the at least one processor, cause the apparatus at least to:
in case the at least one transmission configuration indicator state comprising more than two control resource set groups, transmit an information of association between control resource set groups via signaling of at least one of radio resource control, medium access control control element, or the downlink control information, associating at least two control resource set groups to each other, wherein the first control resource set group and the at least second control resource set group are among the associated control resource set groups.

17. The apparatus of claim 15, wherein, in case the at least one transmission configuration indicator state comprising a first transmission configuration indicator state and a second transmission configuration indicator state, the second indication indicates that the first transmission configuration indicator state is applied to the first control resource set group, and the second transmission configuration indicator state is applied to the at least second control resource set group.

18. The apparatus of claim 15, wherein, in case the at least one transmission configuration indicator state comprising a first transmission configuration indicator state and a second transmission configuration indicator state, the rule comprises applying the first transmission configuration indicator state to the first control resource set group, and applying the second transmission configuration indicator state to the at least second control resource set group.

19. The apparatus of claim 15, wherein, in case the at least one transmission configuration indicator state comprising two transmission configuration indicator states, the rule or the second indication comprises using the control resource set to implicitly indicate mapping of the at least one transmission configuration indicator state to the first control resource set group and the at least second control resource set group.

20. A method, comprising:
- receiving, by a user equipment, on a control resource set belonging to a first control resource set group, downlink control information indicating at least one transmission configuration indicator state;
- mapping, by the user equipment, one or more of the at least one transmission configuration indicator state, indicated by the downlink control information received on the control resource set belonging to the first control resource set group, to at least a second control resource set group;
- mapping, by the user equipment, another one or more of the at least one transmission configuration indicator state, indicated by the downlink control information received on the control resource set belonging to the first control resource set group, to the first control resource set group; and
- receiving, by the user equipment, a first indication indicating which of the at least one transmission configuration indicator state is applied for downlink data channel transmission.

* * * * *